United States Patent [19]

Kovacs et al.

[11] Patent Number: 6,137,514
[45] Date of Patent: Oct. 24, 2000

[54] INK JET PRINTING METHOD

[75] Inventors: Csaba A. Kovacs; Teh-Ming Kung; Charles E. Romano, Jr., all of Rochester, N.Y.

[73] Assignee: Eastman Kodak Company, Rochester, N.Y.

[21] Appl. No.: 09/216,304

[22] Filed: Dec. 18, 1998

[51] Int. Cl.⁷ .................................................. G01D 11/00
[52] U.S. Cl. ............................................. 347/100; 347/105
[58] Field of Search ................................ 347/47, 95, 100, 347/105

[56] References Cited

U.S. PATENT DOCUMENTS

| | | | |
|---|---|---|---|
| 5,254,159 | 10/1993 | Gundlach et al. | 106/22 H |
| 5,532,064 | 7/1996 | Lubar | 428/195 |
| 5,920,331 | 7/1999 | Silverbrook | 347/60 |
| 5,942,465 | 8/1999 | Burns et al. | 503/227 |

FOREIGN PATENT DOCUMENTS 10-219157  8/1998  Japan .

*Primary Examiner*—John Barlow
*Assistant Examiner*—Michael S. Brooke
*Attorney, Agent, or Firm*—Harold E. Cole

[57] ABSTRACT

A method of ink jet printing, wherein an ink jet composition comprising water, a cationic, water soluble dye and from about 0.1% to about 10% by weight of a hardener is ejected onto an image recording element. The recording element is formed of a support and an ink receptive layer, formed on the support, wherein the ink receptive layer comprises a cross linkable polymer.

8 Claims, No Drawings

6,137,514

INK JET PRINTING METHOD

CROSS REFERENCE TO RELATED APPLICATION

Reference is made to commonly-assigned copending U.S. patent application Ser. No. 09/216,531, filed Dec. 18, 1998, Docket 78773HEC entitled "Ink Jet Printing Process", of Gallo et al; and Copending U.S. patent application Ser. No. 09/215,711, filed Dec. 18, 1998, Docket 78797HEC entitled "Ink Jet Printing Process", of Romano, Jr., et al; and Copending U.S. patent application Ser. No. 09/216,558, filed Dec. 18, 1998, Docket 78798HEC entitled "Ink Jet Printing Process", of Romano, Jr., et al; and Copending U.S. patent application Ser. No. 09/216,149, filed Dec. 18, 1998, Docket 78799HEC entitled "Ink Jet Composition", of Romano, Jr., et al; and Copending U.S. patent application Ser. No. 09/216,653, filed Dec. 18, 1998, Docket 78815HEC entitled "Ink Jet Printing Process", of Kovacs et al; and Copending U.S. patent application Ser. No. 09/216,288, filed Dec. 18, 1998, Docket 78818HEC entitled "Ink Jet Printing Process", of Kovacs et al; and Copending U.S. patent application Ser. No. 09/216,147, filed Dec. 18, 1998, Docket 78819HEC entitled "Ink Jet Printing Process", of Kovacs et al; and Copending U.S. patent application Ser. No. 09/216,203, filed Dec. 18, 1998, Docket 78820HEC entitled "Ink Jet Ink Composition", of Kovacs et al; and Copending U.S. patent application Ser. No. 09/216,203, filed Dec. 18, 1998 filed of even date herewith, Docket 78846HEC entitled "Ink Jet Printing Method", of Romano, Jr., et al; and Copending U.S. patent application Ser. No. 09/083,875, filed May 22, 1998, entitled "Inkjet Images on PVA Overcoated with Hardener Solution", of Erdtmann et al.; and Copending U.S. patent application Ser. No. 09/083,605 filed May 22, 1998, entitled "Ink Jet Prints Overcoated with Hardener", of Erdtmann et al., the teachings of which are incorporated herein by reference.

FIELD OF THE INVENTION

This invention relates to an ink jet printing method using a certain ink jet ink composition which provides an image having improved wet abrasion resistance.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature. Commonly used carrier media include water, mixtures of water and organic co-solvents and organic solvents, such as hydrocarbons, esters, ketones, etc.

DESCRIPTION OF RELATED ART

JP 10-219157 relates to an ink jet ink comprising an aqueous medium, a colorant and a very small amount of glutaraldehyde as a biocide.

There is a problem with using this ink, however, in that when it is printed on an image-recording element, the resultant image has poor wet abrasion resistance.

It is an object of this invention to provide a method for using an ink jet ink composition which when printed on an image-recording element will provide an image having an improved wet abrasion resistance. It is another object of this invention to provide a method for using an ink jet composition which employs a cationic, water-soluble dye.

SUMMARY OF THE INVENTION

These and other objects are achieved in accordance with this invention which relates to an ink jet printing method using an ink jet ink composition which provides an image having improved wet abrasion resistance comprising the steps of:

A) providing an ink jet printer that is responsive to digital data signals;

B) loading the printer with an image-recording element comprising a support having thereon an ink-receptive layer comprising a cross-linkable polymer;

C) loading the printer with an ink jet ink composition comprising water, a cationic, water-soluble dye and from about 0.1 to about 10% by weight of a hardener; and D) printing on the image-recording element using the ink jet ink composition in response to the digital data signals.

Use of the invention enables an ink jet image to be obtained on an image-recording element which will have improved wet abrasion resistance. The images also exhibit excellent water-fastness and have superior wet adhesion properties as compared to images made with inks which do not contain any hardener.

DETAILED DESCRIPTION OF THE INVENTION

Any hardener can be used in the composition employed in the method of the invention provided it will cross-link a cross-linkable polymer employed in the recording element onto which the ink composition is printed. Hardeners may be used in the ink composition of the invention in an amount of from about 0.1 to about 10% by weight, preferably from about 0.25 to about 2% by weight.

Examples of hardeners that can be employed in the composition used in the method of the invention of the invention fall into several different classes such as the following (including mixtures thereof):

a) formaldehyde and compounds that contain two or more aldehyde functional groups such as the homologous series of dialdehydes ranging from glyoxal to adipaldehyde including succinaldehyde and glutaraldehyde; diglycolaldehyde; aromatic dialdehydes, etc.;

b) blocked hardeners (substances usually derived from the active hardener that release the active compound under appropriate conditions) such as substances that contain blocked aldehyde functional groups, such as tetrahydro-4-hydroxy-5-methyl-2(1H)-pyrimidinone polymers, polymers of the type having a glyoxal polyol reaction product consisting of 1 anhydroglucose unit: 2 glyoxal units, dimethoxylethanal-melamine non-formaldehyde resins, 2,3-dihydroxy-1,4-dioxane, blocked dialdehydes and N-methylol compounds obtained from the condensation of formaldehyde with various aliphatic or cyclic amides, ureas, and nitrogen heterocycles;

c) active olefinic compounds having two or more olefinic bonds, especially unsubstituted vinyl groups, activated by adjacent electron withdrawing groups, such as divinyl ketone; resorcinol bis(vinylsulfonate); 4,6-bis(vinylsulfonyl)-m-xylene; bis(vinylsulfonylalkyl) ethers and amines; 1,3,5-tris(vinylsulfonyl) hexahydro-s-triazine; diacrylamide; 1,3-bis(acryloyl)urea; N,N'-bismaleimides; bisisomaleimides; bis(2-acetoxyethyl) ketone; 1,3,5-triacryloylhexahydro-s-triazine; and blocked active olefins of the type bis(2-acetoxyethyl) ketone and 3,8-dioxodecane-1,10-bis(pyridinium perchlorate) bis(vinyl sulfonylmethane), bis(vinyl sulfonylmethyl ether), and the like; and d) inorganic salts such as aluminum sulfate; potassium and ammonium alums of aluminum; ammonium zirconium carbonate; chromium salts such as chromium sulfate and chromium alum; and salts of titanium dioxide, zirconium dioxide, etc.

Specific examples of hardeners useful in the composition employed in the method of the invention of the invention include the following:

Hardener 1: aluminum sulfate

Hardener 2: bis(vinyl sulfonylmethane) (Eastman Kodak Company)

Hardener 3: 2,3-dihydroxy-1,4-dioxane (Aldrich Chemical Co.)

Hardener 4: blocked hexamethylene diisocyanate (Bayer Co.)

Hardener 5: glyoxal

Hardener 6: bis(vinyl sulfonylmethyl ether) (Eastman Kodak Company)

Hardener 7: glutaraldehyde

Hardener 8: a glyoxal polyol reaction product consisting of 1 anhydroglucose unit:2 glyoxal units, SEQUAREZ® 755 (Sequa Chemicals, Inc.)

Hardener 9: a cyclic urea glyoxal condensate consisting of 1 cyclic urea unit:1 glyoxal unit, SUNREZ® 700M (Sequa Chemicals, Inc.)

Hardener 10: dimethoxylethanal-melamine non-formaldehyde resin, Sequa CPD3086-100 (Sequa Chemicals, Inc)

Hardener 11: phthaldehyde

In a preferred embodiment, the hardener employed in the composition employed in the method of the invention is aluminum sulfate, bis(vinyl sulfonylmethyl ether), glutaraldehyde, 2,3-dihydroxy-1,4-dioxane or phthaldehyde.

Any cationic, water-soluble dye may be used in the composition employed in the method of the invention, e.g., a dye having a positive charge obtained either by the protonation of an amino group in the dye molecule or by incorporating a positive charge into the dye chromophore. For the protonation, any acid may be used such as lactic acid, citric acid, phthalic acid, maleic acid, acetic acid, etc.

The protonated dye may be pre-formed or prepared in situ. In general, cationic dyes are basic dyes such as azo dyes, triphenylmethane dyes, azine dyes, oxazine dyes, thiazine dyes and the like having amine salt residues or quaternary ammonium groups. Specific examples of basic dyes which can be used in the invention include the following in the COLOR INDEX.: C.I. Basic Yellows 1, 2, 11, 13, 14, 19, 21, 25, 28, 32, 33, 34, 35 and 36, for yellow dyes; C.I. Basic Reds 1, 2, 9, 12, 13, 14, 15, 17, 18, 22, 23, 24, 27, 29, 32, 38, 39 and 40, and C.I. Basic Violets 7, 10, 15, 21, 25, 26, 27 and 28, for magenta dyes; C.I. Basic Blues 1, 3, 5, 7, 9, 19, 21, 22, 24, 25, 26, 28, 29, 40, 41, 44, 45, 47, 54, 58, 59, 60, 64, 65, 66, 67, 68 and 75, for cyan dyes; and C.I. Basic Blacks 2 and 8, for black dyes. Mixtures of these dyes may also be used.

The dye may be present in an amount of from about 0.1 to about 10% by weight, preferably from about 0.25 to about 3% by weight.

A mordant can be employed in the image-recording element used in the method of the invention to fix the cationic dye. For example, there may be used an anionic polymer such as sulfonated and carboxylated polyesters, sulfonated and carboxylated acrylates, poly(vinyl sulfonic acid), poly(vinyl styrene sulfonate sodium salt), sulfonated and carboxylated polyurethanes, sulfonated polyamides, polyolefinic emulsions, carboxylated butadiene, or derivitized anionic gelatin. In a preferred embodiment, the following mordants may be employed in the recording element used in the method of the invention:

Mordant 1 polyester dispersion AQ29 (Eastman Chemical Co.)

Mordant 2 polyester dispersion AQ38 (Eastman Chemical Co.)

Mordant 3 polyester dispersion AQ48 (Eastman Chemical Co.)

Mordant 4 polyester dispersion AQ55 (Eastman Chemical Co.)

Mordant 5 sulfonated polyester EvCote® EV-LC (EvCo Research Co.)

Mordant 6 carboxylated polyester EvCote® EV-565 (EvCo Research Co.)

The above mordants may be employed in any amount effective for the intended purpose. In general, good results are obtained when the mordant is present in an amount of from about 0.5 to about 5 g/m$^2$ of element.

The support for the image-recording element used in the invention can be any of those usually used for ink jet receivers, such as paper, resin-coated paper, poly(ethylene terephthalate), poly(ethylene naphthalate) and microporous materials such as poly polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861.

In a preferred embodiment of the invention, the image-recording element used in the invention comprises a support coated with a subbing layer, a solvent-absorbing layer, and an ink-receiving layer. In the ink-receiving layer, a cross-linkable polymer is used such as gelatin or acetoacetylated poly(vinyl alcohol) as described, for example, in U.S. Pat. No. 4,350,788, the disclosure of which is hereby incorporated by reference. These materials are available commercially as Gohsefimer® from Nippon Gohsei.

The ink-receiving layer used in the image-recording elements employed in the invention can also contain various known additives, including matting agents such as titanium dioxide, zinc oxide, silica and polymeric beads such as crosslinked poly(methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV- absorbing agents; mildew-proofing agents; mordants; antistatic agents, anti-oxidants, optical brighteners, and the like.

A humectant may also be employed in the ink jet composition employed in the method of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the method of the invention is diethylene glycol, glycerol, or diethylene glycol monobutylether. The humectant may be present in any amount effective for the intended purpose. In general, good results have been obtained when the humectant is present in an amount of up to about 70% by weight of the ink jet ink composition, preferably from about 5 to about 30%.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to the composition employed in the invention adjust the surface tension of the ink to an appropriate level. The surfactants may be anionic, cationic, amphoteric or nonionic.

A biocide may be added to the composition employed in the invention to suppress the growth of micro-organisms such as molds, fungi, etc. in aqueous inks. A preferred biocide for the ink composition of the present invention is Proxel® GXL (Zeneca Specialties Co.) at a final concentration of 0.05–0.5 wt. %.

The pH of the aqueous ink composition employed in the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following substituents by weight: cationic dye (0.15–10%), water (20–95 %), hardener (0.1 to 10%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks used in this invention may be employed in ink jet printing wherein liquid ink drops are applied in a controlled fashion to an ink receptive layer substrate, by ejecting ink droplets from a plurality of nozzles or orifices of the print head of an ink jet printer.

The following examples illustrate the utility of the present invention.

EXAMPLES

Example 1

Preparation of Receiver A

A 102 $\mu$m poly(ethylene terephthalate) film support was coated with a subbing layer of acrylonitrile-vinylidene chloride-acrylic acid terpolymer latex (0.11 g/m$^2$). On top of the subbing layer was coated a solvent-absorbing layer of lime-processed Ossein photographic gelatin (Eastman Gelatin) (6.05 g/m$^2$). Over this layer was coated an ink-receiving layer of Mordant 4 (0.77 g/m$^2$), lime-processed Ossein photographic gelatin (2.42 g/m$^2$) and styrene-butadiene polymeric beads (0.11 g/m$^2$) having an average size of 10 $\mu$m.

Preparation of Receiver B

This was prepared the same as Receiver A except that the Mordant 4 was employed at 1.54 g/m$^2$ and the gelatin in the ink-receiving layer was employed at 1.65 g/m$^2$.

Preparation of Stock Solution

A stock solution was prepared by dissolving 5 parts by weight cyan dye (Structure 1 below) with stirring in a mixture of 60 parts glycerol humectant, 60 parts diethylene glycol humectant, 3 parts of Surfynol® 465 surfactant, 1 part of 10% Proxel® GXL biocide in water, 8 parts of 85% lactic acid in water (to protonate the dye) and 860 parts of deionized water as solvent.

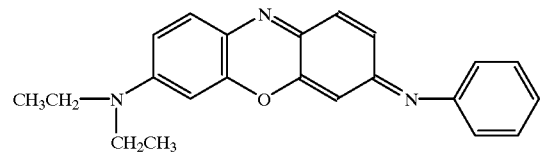

Structure 1

Preparation of Comparative Ink C-1

To 98 parts by weight of the stock solution were added 2 parts by weight of deionized water and the mixture was stirred for one hour.

Preparation of Invention Ink 1

This was the same as C-1 except that the water was replaced with Hardener 1.

Preparation of Invention Ink 2

This was the same as 1 except that the hardener was Hardener 3.

Preparation of Invention Ink 3

This was the same as 1 except that the hardener was Hardener 6.

Preparation of Invention Ink 4

This was the same as 1 except that the hardener was Hardener 11.

Preparation of Invention Ink 5

This was the same as the stock solution except that 783 parts deionized water was employed along with 80 parts by weight of a 25% solution of Hardener 7 in water.

Preparation of Invention Ink 6

To 196 parts by weight of the stock solution were added 3 parts by weight of deionized water, 1 part by weight of Hardener 1 and the mixture was stirred for one hour.

Preparation of Invention Ink 7

This was the same as 6 except that the deionized water was 2 parts by weight and Hardener 1 was 2 parts.

Preparation of Invention Ink 8

To 196 parts by weight of the stock solution were added 4 parts by weight of Hardener 1 and the mixture was stirred for one hour.

Preparation of Invention Ink 9

To 192 parts by weight of the stock solution were added 8 parts by weight of Hardener 1 and the mixture was stirred for one hour.

Preparation of Invention Ink 10

To 184 parts by weight of the stock solution were added 16 parts by weight of Hardener 1 and the mixture was stirred for one hour.

Preparation of Invention Ink 11

This was the same as 6 except that the hardener was Hardener 3.

Preparation of Invention Ink 12

This was the same as 11 except that 2 parts of Hardener 3 were employed and the water was 2 parts.

Preparation of Invention Ink 13

To 196 parts by weight of the stock solution were added 4 parts by weight of Hardener 3 and the mixture was stirred for one hour.

Preparation of Invention Ink 14

To 192 parts by weight of the stock solution were added 8 parts by weight of Hardener 3 and the mixture was stirred for one hour.

Preparation of Invention Ink 15

To 184 parts by weight of the stock solution were added 16 parts by weight of Hardener 3 and the mixture was stirred for one hour.

Example 2

Test For Wet Abrasion

Cyan patches (approximately 9 cm by 10 cm) were printed at 100% laydown using a Hewlett-Packard printer (HP 540C) and an empty Hewlett-Packard cartridge HP-80717-6 filled with the above inks. The patches were printed on receivers A and B, and then allowed to air dry overnight. The prints were cut into 2.5 cm by 10 cm strips.

Optical density was measured with an X-Rite densitometer in the middle of the sample and 2.5 cm from each end of the strip. The strips were then immersed in deionized water for 30 minutes. While still wet, the strips were secured on a metal bar with a 500 g load on top. The strips were then placed on a wet sponge, 4 cm wide Willtec® (Illbruck Co.) and rubbed 10 times. The strips were then allowed to dry at ambient temperature overnight. The reflective optical density was re-measured in the center and 2.5 cm from each end of the strip.

To calculate the percent retained cyan optical density, the optical density after the rub was divided by the optical density before the rub and the result was multiplied by one hundred. The results are shown in the following table:

TABLE

| Receiver | Ink | % Retained Density |
| --- | --- | --- |
| A | C-1 (Control) | 21% |
| A | 1 | 83% |
| A | 2 | 102% |
| A | 3 | 100% |
| A | 4 | 93% |
| A | 5 | 94% |
| A | 6 | 45% |
| A | 7 | 71% |
| A | 9 | 74% |
| A | 10 | 48% |
| B | C-1 (Control) | 26% |
| B | 1 | 83% |
| B | 2 | 97% |
| B | 3 | 100% |
| B | 4 | 91% |
| B | 5 | 92% |
| B | 6 | 59% |
| B | 7 | 82% |
| B | 8 | 76% |
| B | 9 | 79% |
| B | 10 | 99% |
| B | 11 | 75% |
| B | 12 | 89% |
| B | 13 | 99% |
| B | 14 | 99% |
| B | 15 | 99% |

These above results show that the % retained optical density for the cyan patches printed onto the receivers using the ink jet ink composition employed in the process of the invention is higher than the control ink. This means that the ink jet compositions employed in the invention provide an image having improved wet abrasion resistance.

The invention has been described in detail with particular reference to certain preferred embodiments thereof, but it will be understood that variations and modifications can be effected within the spirit and scope of the invention.

What is claimed is:

1. An ink jet printing method using an ink jet ink composition which provides an image having improved wet abrasion resistance comprising the steps of:

A) providing an ink jet printer that is responsive to digital data signals;

B) loading said printer with an image-recording element comprising a support having thereon an ink-receptive layer comprising a cross-linkable polymer;

C) loading said printer with an ink jet ink composition comprising water, a cationic, water-soluble dye and from about 0.1 to about 2% by weight of a hardener; and D) printing on said image-recording element using said ink jet ink composition in response to said digital data signals to cross-link said cross-linkable polymer in the area onto which said ink jet ink composition is printed.

2. The method of claim 1 wherein said dye is present in an amount of from about 0.1 to about 10% by weight of said composition.

3. The method of claim 1 wherein a humectant is present in an amount of up to about 70% by weight of said composition.

4. The method of claim 3 wherein said humectant is diethylene glycol, glycerol or diethylene glycol monobutylether.

5. The method of claim 1 wherein said hardener is aluminum sulfate, bis(vinyl sulfonylmethyl ether), glutaraldehyde, 2,3-dihydroxy-1,4-dioxane or phthaldehyde.

6. The method of claim 1 wherein said cross-linkable polymer is gelatin or acetoacetylated poly(vinyl alcohol).

7. The method of claim 1 wherein said ink-receptive layer also contains a mordant.

8. The method of claim 7 wherein said mordant is a polyester dispersion.

* * * * *